(No Model.)
W. H. BINNS.
CHAIN ADJUSTMENT FOR BICYCLES.
No. 473,817. Patented Apr. 26, 1892.
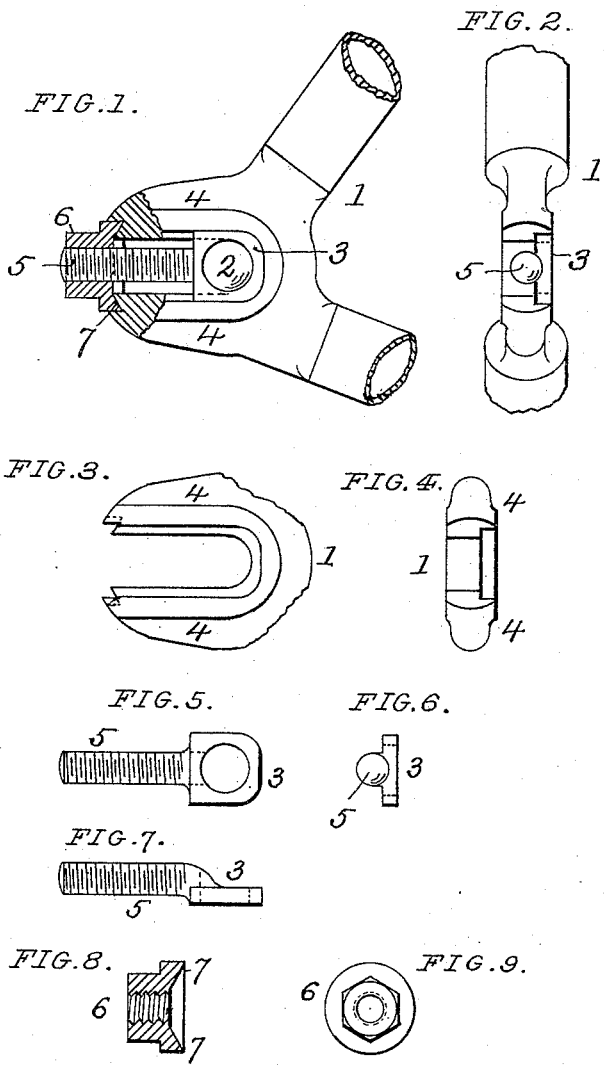
ATTEST:
Geo. H. Arthur
J. A. Young
INVENTOR:
William H. Binns,
by Robert Burns
Attorney.

UNITED STATES PATENT OFFICE.

WILLIAM H. BINNS, OF CHICAGO, ILLINOIS, ASSIGNOR TO THE CHICAGO SEWING MACHINE COMPANY, OF SAME PLACE.

CHAIN ADJUSTMENT FOR BICYCLES.

SPECIFICATION forming part of Letters Patent No. 473,817, dated April 26, 1892.

Application filed December 9, 1891. Serial No. 414,498. (No model.)

*To all whom it may concern:*

Be it known that I, WILLIAM H. BINNS, a citizen of the United States, residing at Chicago, in the county of Cook and State of Illinois, have invented a certain new and useful Improvement in Chain Adjustments for Bicycles; and I do hereby declare the following to be a full, clear, and exact description of the same, reference being had to the accompanying drawings, forming part of this specification.

The present invention relates to the means employed for taking up the slack in the driving-chains of bicycles and like vehicles, its object being to provide a simple and effective adjusting mechanism for such purpose embodying the features of ease of adjustment, combined with strength and durability of parts and a perfect avoidance of the tendency to spread apart of the open-ended rearwardly-projecting portions of the main frame that form the pair of forked guides in which the rearward adjustment of the axle-boxes is effected. I attain such object by the construction and arrangement of parts illustrated in the accompanying drawings, in which—

Figure 1 is a detail side elevation, partly in section, of the rear axle-supporting portion of the main frame or fork of a bicycle to which my present improvement is applied; Fig. 2, a rear elevation of the same with the adjusting-nut removed; Fig. 3, a detail side elevation of the frame or fork portion with the adjusting parts removed; Fig. 4, a rear elevation of the same; Fig. 5, a detached side view of the slidable head or box and its screw-threaded extension; Fig. 6, an end view of the same; Fig. 7, a top view of the same; Fig. 8, a sectional view of the adjusting-nut detached, and Fig. 9 an elevation of the same.

Similar numerals of reference indicate like parts in the different views.

Referring to the drawings, 1 represents the rear end of one of the rearwardly-extending fork members of the main frame of a bicycle or like vehicle, in which the driving-wheel is supported by means of an axial spindle 2, held in the sliding head or box 3, arranged to slide between the rearwardly-extending top and bottom horns 4 4, that are recessed to form suitable guides for said head or box 3 and which have an open space at the rear for the ready detachment of the wheel in the usual manner.

So far as described the construction is of the usual form employed in Safety-bicycle construction, the present invention consisting solely in extending back from the head or box 3 a threaded extension 5, on which screws the cap-nut 6, which has bearing against the rear ends of the horns 4 4, as shown, and it is preferable to form said nut with an annular lip 7 of any suitable section, either a square or V shape, that engages in a correspondingly-formed recess in the end of the horns 4 4, so as to obtain a more firm bearing upon the same, and at the same time act as a tie to hold the same together against a tendency to spreading in the ordinary use of the bicycle or other vehicle.

Having thus fully described my said invention, what I claim as new, and desire to secure by Letters Patent, is—

1. In a bicycle or like vehicle, the combination, with the rearwardly-extending guide-horns 4 4 on the main frame, of the head or box 3, having a screw-threaded extension 5, and a cap-nut 6, screwing upon such extension and having an annular lip 7 to engage the rear ends of the horns to tie the same together against a tendency to spread apart, substantially as set forth.

2. In a bicycle or like vehicle, the combination, with the rearwardly-extending guide-horns 4 4 of the main frame, of the head or box 3, having a screw-threaded extension 5, and a cap-nut 6, screwing upon such extension and having an annular lip 7, having a V-shaped section to engage the rear ends of the horns to tie the same together against a tendency to spread apart, substantially as set forth.

In testimony whereof witness my hand this 7th day of December, 1891.

WILLIAM H. BINNS.

In presence of—
J. W. KISER,
ROBERT BURNS.